(12) United States Patent
Ichie et al.

(10) Patent No.: US 8,793,345 B2
(45) Date of Patent: Jul. 29, 2014

(54) CONTROL TERMINAL, NETWORK SYSTEM, AND CONTENT PLAYING METHOD

(75) Inventors: Akira Ichie, Ome (JP); Masashi Tsuji, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 131 days.

(21) Appl. No.: 13/407,445

(22) Filed: Feb. 28, 2012

(65) Prior Publication Data

US 2013/0007222 A1 Jan. 3, 2013

(30) Foreign Application Priority Data

Jun. 30, 2011 (JP) ................................. 2011-146079

(51) Int. Cl.
*G06F 15/16* (2006.01)
(52) U.S. Cl.
USPC .......................................................... 709/219
(58) Field of Classification Search
USPC .................... 709/217, 219, 220, 223
See application file for complete search history.

(56) References Cited

U.S. PATENT DOCUMENTS

| 2010/0131613 | A1* | 5/2010 | Jonsson et al. ................ 709/218 |
| 2010/0180312 | A1* | 7/2010 | Toya .............................. 725/78 |
| 2011/0055878 | A1 | 3/2011 | Mizuno et al. |
| 2011/0295972 | A1 | 12/2011 | Nagatomo |

FOREIGN PATENT DOCUMENTS

| JP | 2004-056191 | 2/2004 |
| JP | 2005-020180 | 1/2005 |
| JP | 2007-264922 | 11/2007 |
| JP | 2008-102870 | 5/2008 |
| JP | 2008204269 | 9/2008 |
| JP | 2010-282374 | 12/2010 |
| JP | 2011-045021 | 3/2011 |
| JP | 2011-239244 | 11/2011 |
| JP | 2011-248732 | 12/2011 |

OTHER PUBLICATIONS

Japanese Patent Application No. 2011-146079, Notice of Rejection, mailed Jun. 19, 2012, (with English Translation).

\* cited by examiner

*Primary Examiner* — Larry Donaghue
*Assistant Examiner* — Marshall McLeod
(74) *Attorney, Agent, or Firm* — Blakely, Sokoloff, Taylor & Zafman LLP

(57) ABSTRACT

According to one embodiment, a control terminal includes: a content information obtaining module; a content selector; an identifier converter; and a remote-control-server controller. The content information obtaining module obtains content information presented by a content sender. The content selector selects, from the content information, a content to be played. The identifier converter converts, if a device identifier of the content sender is identical to a device identifier of a content receiver, content information of the selected content into a content identifier for remote controlling in a remote control server, based on a conversion rule set in advance. Here, the remote control server controls remote operations with respect to content on the network. The remote-control-server controller sends, based on the content identifier for remote controlling, a play control message to the remote control server comprising a device identifier same as that of the content sender and of the content receiver.

6 Claims, 12 Drawing Sheets

CONTENT IDENTIFIER http://192.168.0.100:10000/video/hdd/content_00000123.mpg

DEVICE IDENTIFIER 192.168.0.100

CONTENT REQUEST

GET /video/hdd/content_00000123.mpg HTTP/1.1
HOST: 192.168.0.100:10000

CONTROL TERMINAL, NETWORK SYSTEM, AND CONTENT PLAYING METHOD

CROSS-REFERENCE TO RELATED APPLICATIONS

This application is based upon and claims the benefit of priority from Japanese Patent Application No. 2011-146079, filed Jun. 30, 2011, the entire contents of which are incorporated herein by reference.

FIELD

Embodiments described herein relate generally to a control terminal, a network system, and a content playing method.

BACKGROUND

Currently, electronic devices compliant to the universal plug and play (UPnP, registered trademark) audio/video (AV) standard and compliant to the digital living network alliance (DLNA) guideline have come into common use. In the UPnP AV standard, a protocol designed for playing AV content is set as the higher layer of UPnP protocols that enable participation in a network just by connecting electronic devices to the network. The DLNA guideline represents the industry standard for providing compatibility among electronic devices and for enabling configuration of a network comprising domestic electronic devices. The DLNA guideline implements the UPnP protocols as the means of communication among the electronic devices.

In the UPnP standard, devices as well as control points for controlling the devices are defined. In the UPnP AV standard, media servers (UPnP AV media servers) that are responsible for content accumulation and media renderers (UPnP AV Media Renderers) responsible for playing content are defined as devices. Moreover, control points (UPnP AV control points) find devices on a network, and control those devices. In the UPnP AV standard, from media servers selected at a control point, the media renderers selected at that control point obtain contents via the network, and perform control to play the contents.

Conventionally, under the DLNA guideline implementing the UPnP standard, if there exist a digital media server (DMS) and a digital media renderer (DMR) in the same device, network transfer process of when content is transmitted and received through the network is performed, as similar to the case when the DMS and the DMR are provided separately. Here, the DMS is a content sender equivalent to the media server, and holds contents specified by a control terminal (digital media controller (DMC)) which is equivalent to the control point. Further, the DMR is a content receiver equivalent to the media renderer.

However, as described above, if the DMS and the DMR are installed in the same device and if the transfer of contents therebetween is performed via the network transfer process; then the resources of that device are unnecessarily consumed. Moreover, in a content transmitting and receiving device comprising the DMS as well as the DMR, depending on the specifications or depending on the resource usage status of the content sending and receiving apparatus, the contents may not be able to be transferred.

BRIEF DESCRIPTION OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

In general, according to one embodiment, a control terminal is configured to be connectable to a content sender and a content receiver via a network. Here, the content sender is configured to send a specified content, and the content receiver is configured to receive the content sent by the content sender. The control terminal comprises: a content information obtaining module; a content selector; an identifier converter; and a remote-control-server controller. The content information obtaining module is configured to obtain a portion of or an entire pieces of content information presented by one or more content sender connected to the network. The content selector is configured to select, from the portion of or the entire pieces of content information, a content to be played. The identifier converter configured to convert, if a device identifier of the content sender which is to send the selected content is identical to a device identifier of the content receiver which is to receive the selected content, content information of the selected content into a content identifier for remote controlling in a remote control server, based on a conversion rule set in advance. Here, the remote control server is configured to control remote operations with respect to content on the network. The remote-control-server controller is configured to send, based on the content identifier for remote controlling, a play control message of the selected content to the remote control server comprising a device identifier same as that of the content sender and of the content receiver.

An exemplary embodiment is explained below with reference to the accompanying drawings. In the following explanation, each apparatus according to the embodiment is assumed to be compliant to the UPnP AV standard and to the DLNA guideline. However, alternatively, configurations of the embodiment described below are also applicable to an apparatus or a system compliant to a standard equivalent to or compatible with the UPnP AV standard and to the DLNA guideline. Moreover, the configurations of the embodiment are also applicable to an apparatus or a system that has independent specifications.

First of all, explained below in brief is an overall configuration of a network system comprising a plurality of electronic devices compliant to the UPnP AV standard and to the DLNA guideline, that is, a plurality of electronic devices operating according to the UPnP AV standard and the DLNA guideline.

Figure 1:
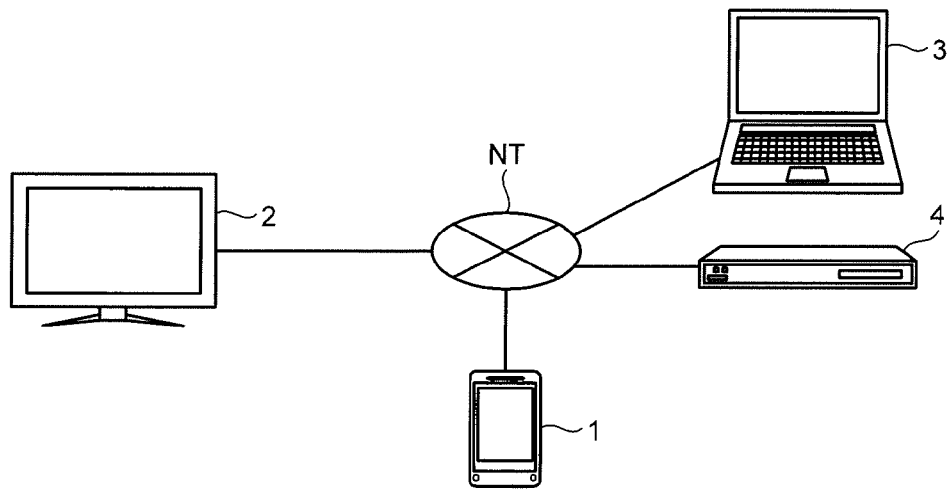
FIG. 1 is an exemplary diagram of an overall configuration of a network system according to an embodiment.

FIG. 1 is a diagram illustrating an example of an overall configuration of a network system in which a plurality of electronic devices compliant to the UPnP AV standard and the DLNA guideline is connected with each other via a network. In the example illustrated in FIG. 1, a television receiver 2, an information processing apparatus 3 such as a personal computer (PC), and a recorder 4 such as a hard disk drive (HDD) recorder or a blue-ray (registered trademark) disk recorder, are connected to a control terminal 1 such as a tablet terminal or a personal digital assistant (PDA) via a network NT such as a local area network (LAN). Here, the television receiver 2, the information processing apparatus 3, and the recorder 4 are aforementioned devices compliant to the UPnP standard, and have a content accumulating function such as a recording function. Herein, the network NT can either be a wired network or be a wireless network, or can be a network having a combination of both. Meanwhile, the number of devices or the types of devices connected to the network are not limited to the example illustrated in FIG. 1. That is, it is possible to connect various different types of devices that are compliant to the UPnP AV standard.

In the UPnP AV standard, devices responsible for content accumulation are defined as media servers (UPnP AV media servers). Thus, the television receiver 2, the information processing apparatus 3, and the recorder 4, which have a content accumulating function such as the recording function, are defined as media servers (UPnP AV media servers). In contrast, devices responsible for playing content are defined as media renderers (UPnP AV media renderers). Thus, the television receiver 2 and the information processing apparatus 3, which have a content playing function, are defined as media renderers (UPnP AV media renderers).

In the DLNA guideline implementing the UPnP AV standard, devices responsible for content accumulation (content senders) are defined as digital media servers (DMSs). Thus, the television receiver 2, the information processing apparatus 3, and the recorder 4, which have a content accumulating function such as the recording function, are defined as DMSs. In contrast, devices responsible for playing content (content receivers) are defined as digital media renderers (DMRs). Thus, the television receiver 2 and the information processing apparatus 3, which have a content play function, are defined as DMRs. Besides, according to the DLNA guideline, devices that instruct DMRs to obtain or play contents are defined as digital media controllers (DMCs). Thus, the control terminal 1 is defined as a DMC.

Herein, on the basis of the definitions according to the DLNA guideline; a device that performs content accumulation, provides content information to a DMC, and supplies a specific content to a DMR in response to a request from the DMR, is referred to as a DMS. Furthermore, a device that, in response to a request from a DMC, receives a specific content from the DMS and plays the content, is referred to as a DMR.

Besides, an apparatus that comprises not only the DMS of the abovementioned type but also the DMR of the abovementioned type is referred to as a content sending and receiving apparatus. Thus, from the perspective of other apparatuses, the content sending and receiving apparatus not only functions as an apparatus comprising the DMS but also functions as an apparatus comprising the DMR. In the embodiment, the television receiver 2 functions as the content sending and receiving apparatus that comprises the DMS as well as the DMR.

Explained below is a brief overview of operations of each apparatus installed in the network system illustrated in FIG. 1.

Figure 2:
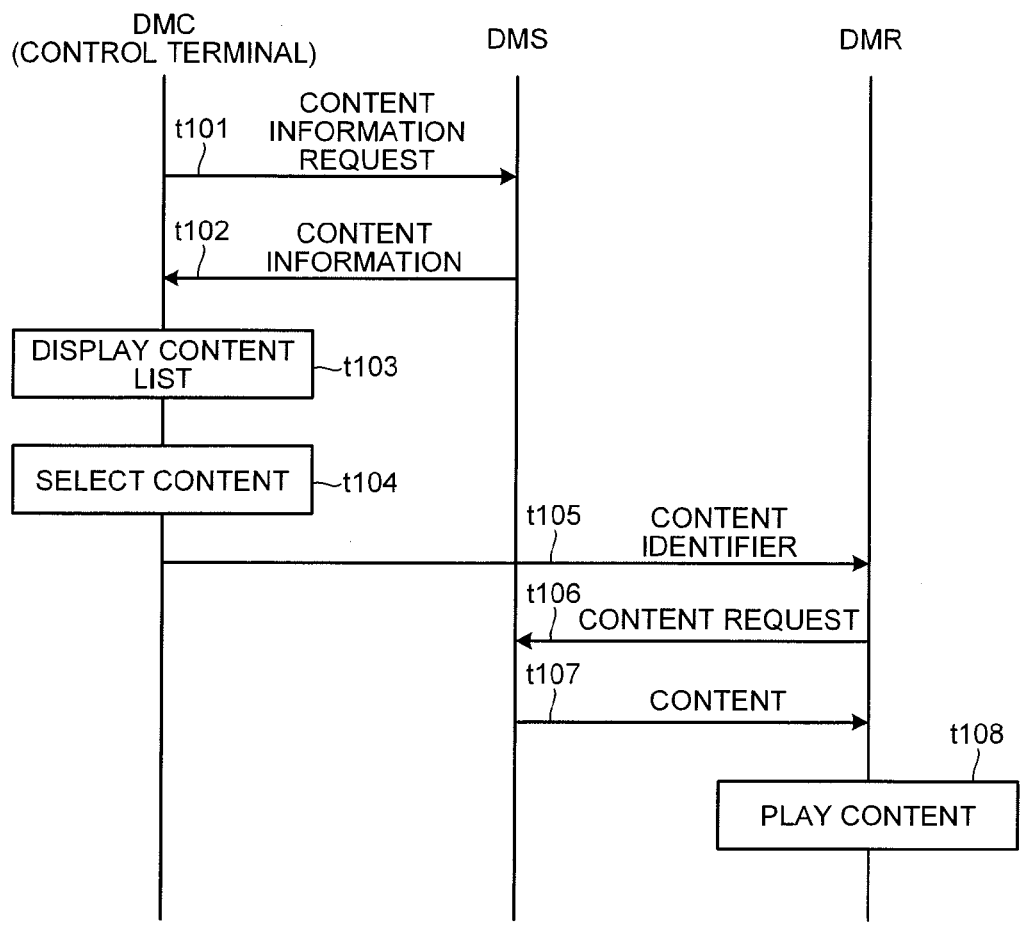
FIG. 2 is an exemplary sequence diagram for explaining a brief overview of DLNA-based operations among apparatuses, in the embodiment.
Figures 3, 4, 5, 6:
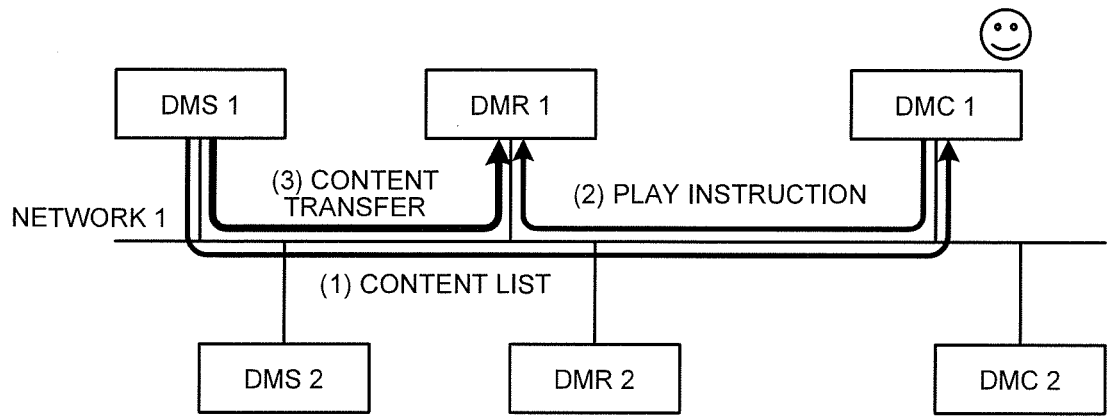
FIG. 3 is an exemplary explanatory diagram for explaining the commonly-performed operation for transferring a content as illustrated in FIG. 2, in the embodiment.
FIG. 4 is an exemplary diagram of a content identifier in the embodiment.
FIG. 5 is an exemplary diagram of a device identifier in the embodiment.
FIG. 6 is an exemplary diagram of a content request issued in the embodiment.

FIG. 2 is a sequence diagram for explaining a brief overview of DLNA-based operations among the apparatuses. FIG. 3 is an explanatory diagram for explaining the commonly-performed operation for transferring a content as illustrated in FIG. 2. Herein, it is assumed that, based on the UPnP protocols, a DMC (the control terminal 1) has already searched for each apparatus in the network NT, and it is assumed that the user has already selected one of the DMRs by operating the DMC (the control terminal 1).

The DMC (the control terminal 1) that supports the UPnP AV standard issues a request for content information to the DMS such as the television receiver 2 or the recorder 4 via the network NT (t101), and obtains content information from the DMS (t102).

Subsequently, the DMC (the control terminal 1) presents a content list to the user who is operating the DMC (the control terminal 1) (for example, displays the content list on a display module of the control terminal 1) (t103: (1) in FIG. 3).

The content information sent by the DMS contains information for presenting a content list to the user or contains information that can make up content identifiers. For example, the content information sent by the DMS contains meta information (title, content type, artist, category, play time, date created, channel, recording start timing, etc.) of all contents or contains content URLs. Herein, the content identifier is a uniform resource identifier (URI) of a specific content, and is information that is notified to the DMR by the DMC (the control terminal 1), as an argument of the SetAVTransportURI action that is specified in the UPnP AV transport service. The URI of a specific content further contains a device identifier for identifying the DMS which holds that specific content. The device identifier contains the Internet protocol (IP) address (a number for identifying a device on the network) of the DMS. In addition, the device identifier may also contain a port number.

FIG. 4 illustrates an example of the content identifier used in the embodiment. In this example, "http://" is followed by the IP address (192.168.0.100) and the port number (10000) of the DMS. Then, the path (/video/hdd/content_00000123.mpg) to a specific content is specified. In the case when the DMS is storing a plurality of contents, the content information sent by the DMS contains identifiers as well as attribute information of all contents. As the content information to be presented to the user, the file name of each content (such as "content_00000123.mpg" or the like) or the tile of each content can be presented. Meanwhile, in the embodiment, the IP address specified in a content identifier is used as the device identifier (FIG. 5).

Subsequently, from the content information that has been presented, the user operating the DMC (the control terminal 1) selects a content to be played (t104).

Then, the DMC (the control terminal 1) extracts or generates the content identifier from the content information of the content selected by the user (i.e., the specified content). Then, in order to play the content selected by the user, the DMC (the control terminal 1) makes use of the SetAVTransportURI action, and sends the corresponding content identifier to the DMR that has already been selected by the user (t105: (2) in FIG. 3). Alternatively, at t105, the user may also select a DMR which is to play the specified content.

Based on the content identifier received from the DMC (the control terminal 1), the DMR requests the DMS holding the corresponding specified content to send the content (t106). The DMS then transfers the requested content to the selected DMR (t107: (3) in FIG. 3). Upon receiving the transferred content, the DMR plays the content (t108).

The content request sent via the network NT is issued in the form of an HTTP GET request message or an RTSP message with respect to the URI of the specified content. Such a content request is sent by the DMR to an external DMS. FIG. 6 illustrates an exemplary content request issued in the form of an HTTP GET request message. In the example illustrated in FIG. 6, "GET" is followed by: the path (/video/hdd/content_00000123.mpg) to the content; the HTTP version (HTTP/1.1); the host IP address (192.168.0.100); and the port number (10000), in this order.

Figure 7:
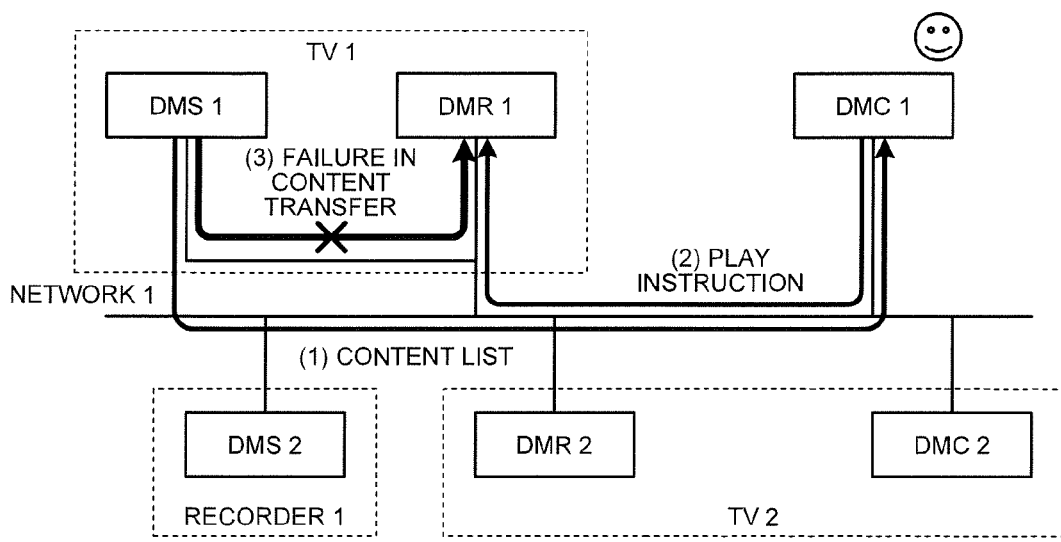
FIG. 7 is an exemplary diagram for explaining an operation in which the transfer of a content fails, in the embodiment.

Meanwhile, as described above, the television receiver 2 serves as a content sending and receiving apparatus having the functions of not only the DMS but also the DMR. As illustrated in FIG. 7, consider a content sending and receiving apparatus comprising: a DMS which serves as the source from which the content selected at the DMC (the control terminal 1) is to be transferred; and also a DMR which serves as the destination of the transferred content. In such a content sending and receiving apparatus, the transfer of the content might be failed due to the competition among the resources that are necessary for streaming (for example, due to the competition among a buffer memory used in network transfer, an encoding engine, a codec engine, a bus band frequency, and a processor).

Thus, in the network system according to the embodiment, the failure of the transfer of the content is resolved by the control terminal 1 (DMC), such as a tablet, that remotely controls the television receiver 2.

Figure 8:
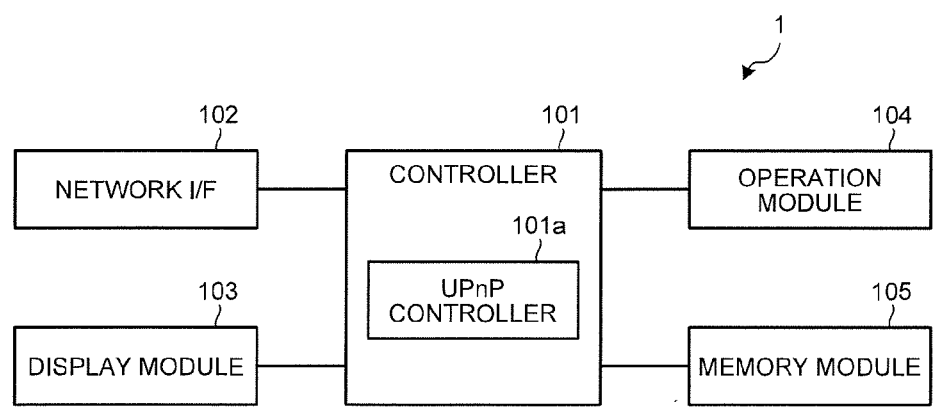
FIG. 8 is an exemplary block diagram of a functional configuration of a control terminal in the embodiment.

FIG. 8 illustrates a block diagram of a functional configuration of the control terminal 1. As illustrated in FIG. 8, the control terminal 1 comprises a controller 101, a network interface (I/F) 102, a display module 103, an operation module 104, and a memory module 105.

The controller 101 is configured with a microcontroller or a central processing unit (CPU), a random access memory (RAM), and a read only memory (ROM). The controller 101 controls the operations of the control terminal 1. For example, the CPU loads various computer programs from the ROM in a work area of the RAM, and sequentially executes the computer programs. Accordingly, the CPU outputs control signals to the constituent elements of the control terminal 1, and controls the operations thereof.

The network I/F 102 as a communication module is an interface for performing communication via the network NT under the control of the controller 101. More particularly, the network I/F 102 performs communication, according to the UPnP AV standard described above, with devices such as the television receiver 2, the information processing apparatus 3, and the recorder 4 that are connected via the network NT.

The display module 103 as a display module is a liquid crystal display (LCD) or the like. The display module 103 displays an operation screen or an error display screen under the control of the controller 101. The control terminal 1 notifies the user of the processing results through the display screen's displayed by the display module 103. Alternatively, under the control of the controller 101, a voice output from a speaker (not illustrated) can also be used to notify the user.

The operation module 104 as an operation module is configured with operation keys or with a touch-sensitive panel for receiving operation instructions from the user. The received operation instructions are then forwarded to the controller 101. The memory module 105 points to a RAM or a rewritable nonvolatile memory.

As a functional configuration according to the embodiment, the controller 101 described above comprises a UPnP controller 101a, which controls the communication performed by the network I/F 102 using the UPnP AV standard via the network NT. More particularly, the UPnP controller 101a controls the searching of devices that are connected to the network NT, controls the obtaining of predetermined information such as content information from the devices that are searched, and controls the communication regarding the actions to be taken with respect to the devices that are searched. Meanwhile, the information obtained from each device is stored in a memory such as a RAM in the memory module 105 under the control of the UPnP controller 101a.

Figure 9:
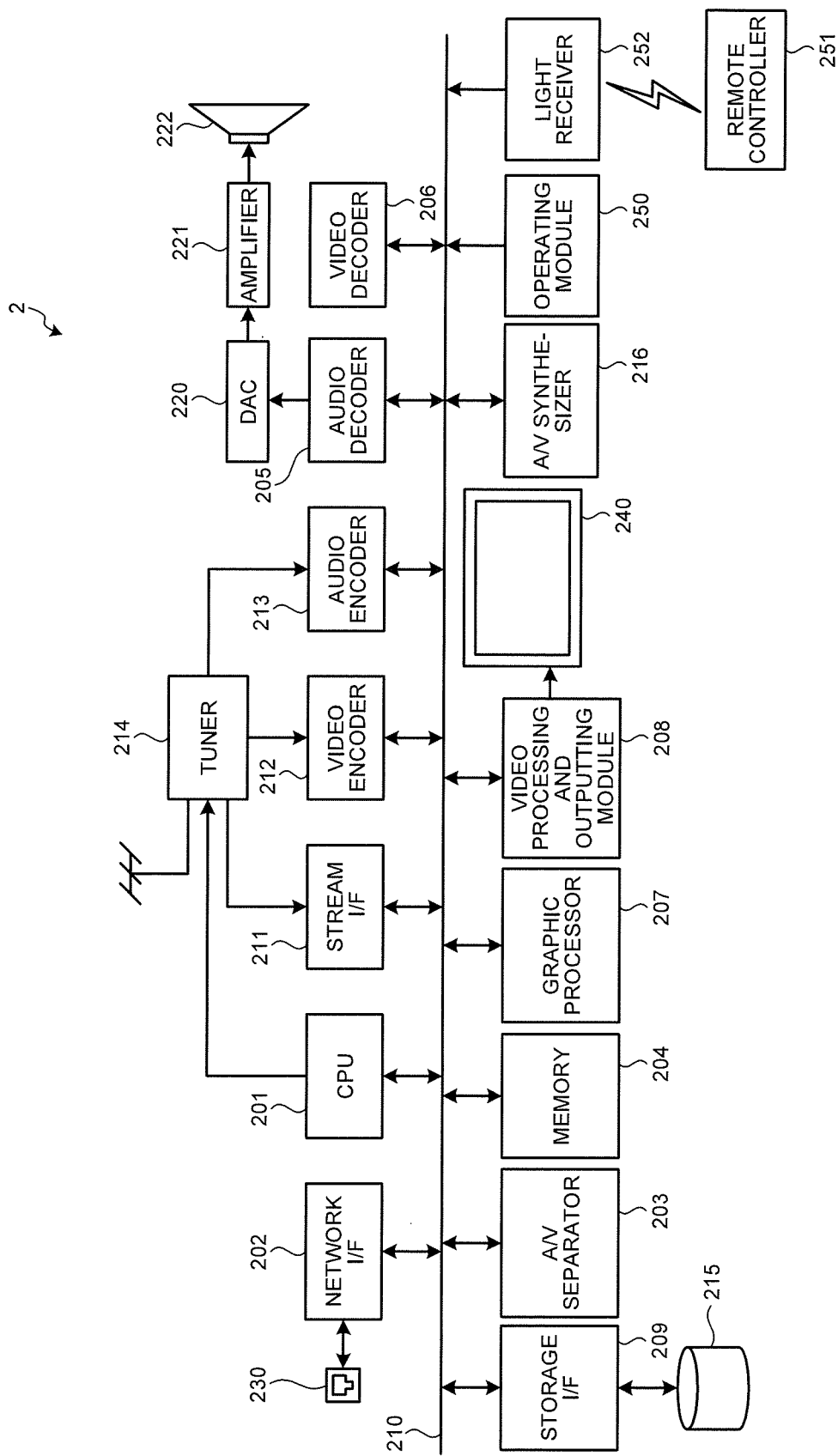
FIG. 9 is an exemplary block diagram of a hardware configuration of a television receiver in the embodiment.

Given below with reference to FIG. 9 is the explanation regarding the television receiver 2 that is an example of a content sending and receiving apparatus having the functions of not only the DMS but also the DMR.

FIG. 9 is a block diagram of a hardware configuration of the television receiver 2. As illustrated in FIG. 9, the television receiver 2 comprises a CPU 201, a network I/F 202, an A/V separator 203, a memory 204, an audio decoder 205, a video decoder 206, a graphic processor 207, a video processing and outputting module 208, a storage I/F 209, a bus 210, a stream I/F 211, a video encoder 212, an audio encoder 213, a tuner 214, an HDD 215, an A/V synthesizer 216, a digital-to-audio converter (DAC) 220, an amplifier 221, a speaker 222, a terminal 230, a display panel 240, an operating module 250, a remote controller 251, and a light receiver 252.

Analog video signals received by the tuner 214 are encoded by the video encoder 212. Similarly, the analog audio signals received by the tuner 214 are encoded by the audio encoder 213. Subsequently, the A/V synthesizer 216 synthesizes the encoded video signals with the encoded audio signals into a stream. Meanwhile, the tuner 214 also receives digital video signals, which are then input to the stream I/F 211 as, for example, a stream of MPEG2TS (Transport Stream). Then, that stream is stored in the HDD 215 via the storage I/F 209.

The terminal 230 is an Ethernet (registered trademark) terminal used in establishing a connection with the network NT. Via the terminal 230 and the network I/F 202, the television receiver 2 receives the information input by other DMSs that are present on the network NT.

Under the control of the CPU 201, the A/V separator 203 separates the stream stored in the HDD 215 into video data and audio data, or separates the data of a content input from another DMS via the terminal 230 and the network I/F 202 and which is temporarily stored in the memory 204, into video data and audio data. The video data obtained by separation is then decoded by the video decoder 206. Then, the video processing and outputting module 208 outputs the decoded video data as video signals for display on the display panel 240. Similarly, the audio data obtained by separation is then decoded by the audio decoder 205. Then, the decoded audio data is output from the speaker 222 via the DAC 220 and the amplifier 221.

The CPU 201 executes various computer programs stored in the HDD 215 or stored in a memory medium such as a ROM (not illustrated), and comprehensively controls the operations of the television receiver 2. More particularly, the CPU 201 operates in cooperation with the graphic processor 207 to generate, for example, a graphical user interface (GUI) display screen. Then, the CPU 201 stores the GUI display screen in the memory 204 such as a RAM, and appropriately reads GUI display screen for displaying it on the display panel 240. Moreover, when the television receiver 2 is operated with the remote controller 251, the CPU 201 receives the operations via the operating module 250 and the light receiver 252. Then, depending on the operation details, the CPU 201 performs an operation such as switching the broadcast signal (channel) received by the tuner 214 or detecting an input performed on the GUI display screen.

Figure 10:
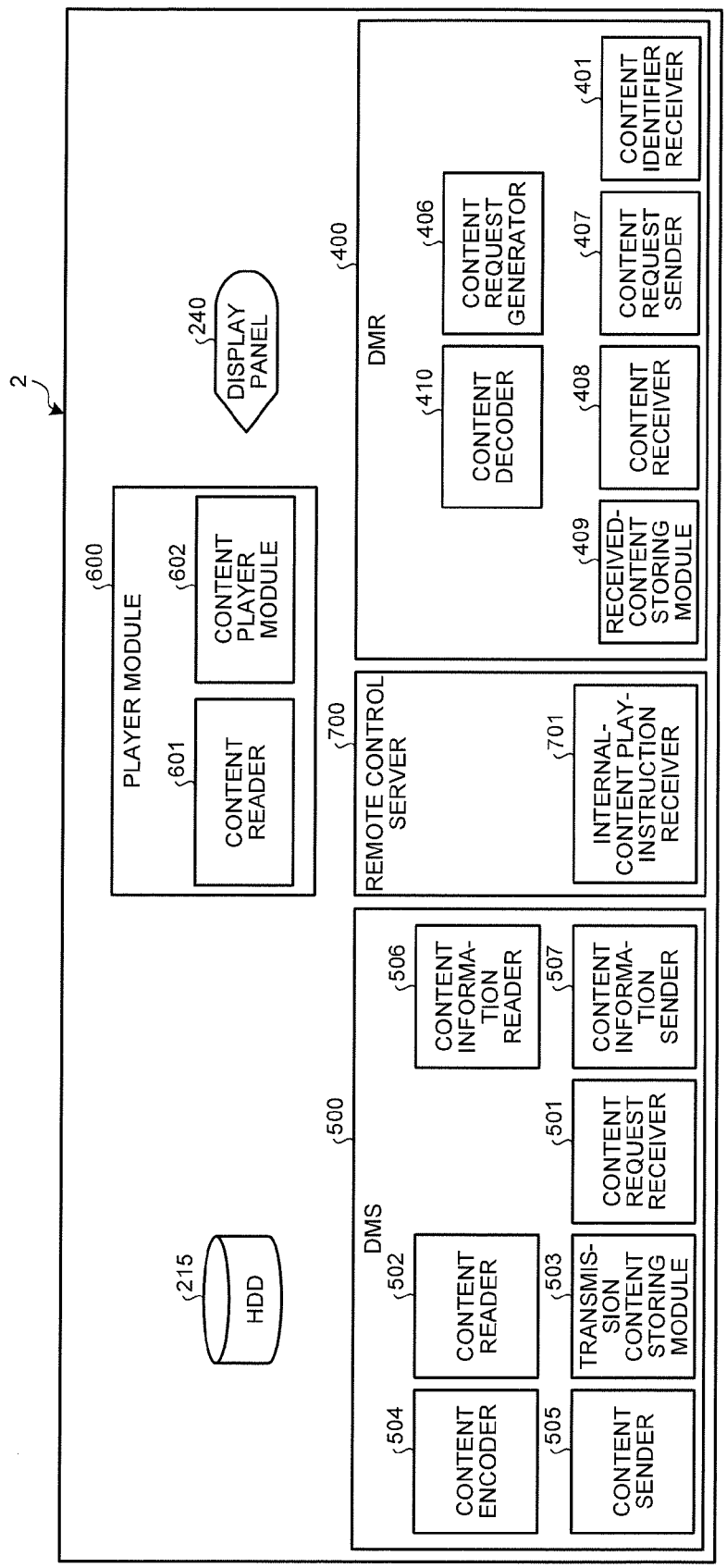
FIG. 10 is an exemplary block diagram of a functional configuration of the television receiver serving as a content sending and receiving apparatus in the embodiment.

Explained below is a functional configuration of the television receiver 2 serving as a content sending and receiving apparatus. FIG. 10 is a block diagram of a functional configuration of the television receiver 2 serving as a content sending and receiving apparatus. The functional configuration explained below is applicable to any apparatus that serves as a content sending and receiving apparatus comprising the DMS as well as the DMR. Moreover, as far as which hardware components perform operations of which functional modules is concerned, it is a matter of apparatus-specific design.

As illustrated in FIG. 10, the television receiver 2 comprises a DMR 400, a DMS 500, a player module 600, and a remote control server 700.

The DMR 400 receives a specific content from a DMS (external) in response to a request from the control terminal 1, and transfers that content to the player module 600.

The DMS 500 accumulates contents, provides content information to the control terminal 1, and provides a specific content to a DMR in response to a request from the DMR.

Via the control terminal 1 such as the tablet terminal or the PDA, the remote control server 700 controls remote operations performed on the contents available on the network NT, such as the contents stored in the television receiver 2. The control terminal 1 such as the tablet terminal or the PDA comprises an application installed for performing operations in cooperation with the television receiver 2. Thus, for example, if there is published a program tag list that is created by compiling chapters (time specifications) regarding a content (a prerecorded program) stored in the television receiver 2, the remote control server 700 can be used to incorporate the program tag list in the control terminal 1 via the network NT. That makes it possible to easily perform random accesses in accordance with the tag list.

The player module 600 plays the content provided to the DMR 400 from outside or plays the content accumulated in the DMS 500 by the remote controlling via the remote control server 700.

In the television receiver 2, the DMR 400 comprises a content identifier receiver 401, a content request generator 406, a content request sender 407, a content receiver 408, a received-content storing module 409, and a content decoder 410.

The content identifier receiver 401 (FIG. 9: the network I/F 202 and the CPU 201) has the function of receiving content identifiers from the control terminal 1 via the network NT.

The content request generator 406 (FIG. 9: the CPU 201) generates a content request according to the content identifier received by the content identifier receiver 401.

The content request sender 407 (FIG. 9: the network I/F 202 and the CPU 201) sends the content request generated by the content request generator 406 to the respective DMS via the network NT.

The content receiver 408 (FIG. 9: the network I/F 202 and the CPU 201) receives the content sent in response to the content request sent by the content request sender 407.

The received-content storing module 409 (FIG. 9: the memory 204) is a receiving buffer used to temporarily store the content received by the content receiver 408.

The content decoder 410 (FIG. 9: the video decoder 206 and the CPU 201) is a decoding engine for decoding an encoded content stored in the received-content storing module 409, and then returns the decoded content to the received-content storing module 409. The operations performed by the content decoder 410 are based on the DTCP-IP standard (DTCP-IP stands for digital transmission content protection over Internet Protocol) that is set for the purpose of contents protection.

In the television receiver 2, the DMS 500 comprises a content information reader 506, a content information sender 507, a content request receiver 501, a content reader 502, a transmission content storing module 503, a content encoder 504, and a content sender 505.

The content information reader 506 (FIG. 9: the storage I/F 209 and the CPU 201) reads, from a content accumulating module (FIG. 9: the HDD 215), the content information according to a request for the content information issued by the DMC (the control terminal 1).

The content information sender 507 (FIG. 9: the network I/F 202 and the CPU 201) sends the content information (content list) that has been read, to the DMC (the control terminal 1).

The content request receiver 501 (FIG. 9: the network I/F 202 and the CPU 201) receives content requests from DMRs via the network NT.

The content reader 502 (FIG. 9: the storage I/F 209 and the CPU 201) reads, from a content accumulating module (FIG. 9: the HDD 215), the specified content in response to the received content request. Meanwhile, as the abovementioned content accumulating module, it is possible to use either an internal storage of the television receiver 2 (in the example illustrated in FIG. 9, the HDD 215) or an external storage connected via the network NT or via another interface.

The transmission content storing module 503 (FIG. 9: the memory 204) is a transmission buffer used in temporarily storing the content that have been read.

The content encoder 504 (FIG. 9: the CPU 201 or an encoder (not illustrated)) is an encoding engine for encoding a transmission content stored in the transmission content storing module 503, and then returns the encoded content to the transmission content storing module 503. The operations performed by the content encoder 504 are based on the DTCP-IP standard set for the purpose of contents protection.

The content sender 505 (FIG. 9: the network I/F 202 and the CPU 201) sends a transmission content stored in an encoded form in the transmission content storing module 503, to the DMR (external) that had issued the corresponding content request.

In the television receiver 2, the remote control server 700 comprises an internal-content play-instruction receiver 701.

The internal-content play-instruction receiver 701 (FIG. 9: the network I/F 202 and the CPU 201) receives a content play instruction for playing a predetermined content that is sent by the control terminal 1 and that is accumulated in an internal storage (in the example illustrated in FIG. 9, the HDD 215) of the television receiver 2.

In the television receiver 2, the player module 600 comprises a content reader 601 and a content player module 602.

The content reader 601 (FIG. 9: the storage I/F 209 and the CPU 201) reads, from a content accumulating module (FIG. 9: the HDD 215), the specified content according to a content play instruction received by the internal-content play-instruction receiver 701 of the remote control server 700. Meanwhile, as the abovementioned content accumulating module, it is possible to use either an internal storage of the television receiver 2 (in the example illustrated in FIG. 9, the HDD 215) or an external storage connected via the network NT or via another interface.

The content player module 602 (FIG. 9: the CPU 201, the A/V separator 203, the video processing and outputting module 208, the audio decoder 205, the DAC 220, and the amplifier 221) plays a content stored in a decoded form in the received-content storing module 409, or plays a content read by the content reader 601 from a content accumulating module (FIG. 9: the HDD 215). The played content is output to a content output apparatus (FIG. 9: the display panel 240 and the speaker 222). Herein, the content output apparatus can be an apparatus embedded in the television receiver 2 or can be an external apparatus connected via the network NT or via another interface. Moreover, the content output apparatus to which the content player module 602 outputs contents is not limited to an apparatus that presents the contents to the user. Alternatively, the content output apparatus can also be an internal storage of the television receiver 2 or an external storage connected via the network NT or via another interface.

Figure 11:
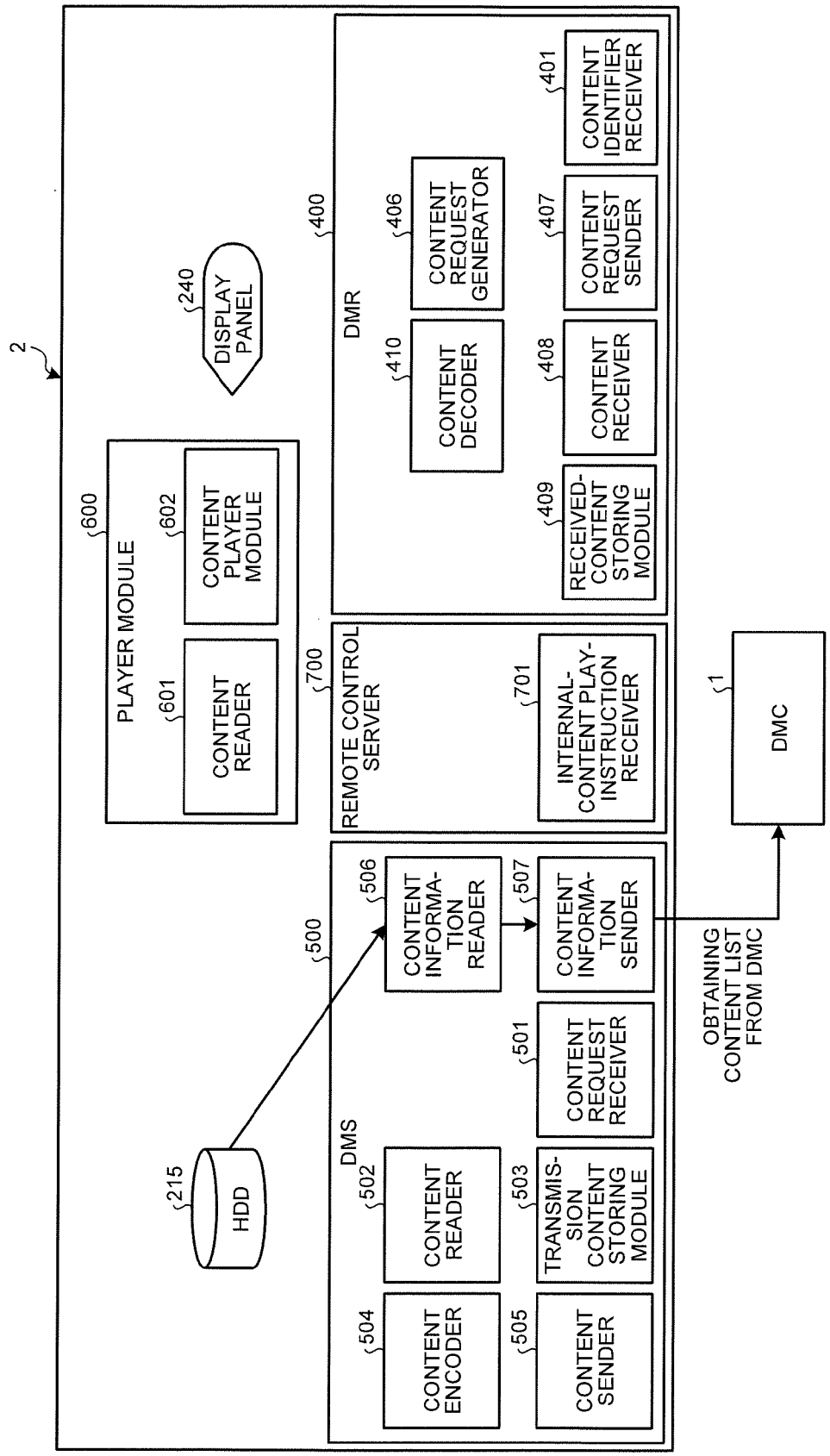
FIG. 11 is an exemplary diagram for explaining the operation of obtaining content information from a DMS in the embodiment.

Explained below in detail is the operation of obtaining content information from the DMS 500 of the basic television receiver 2. FIG. 11 is an explanatory diagram for explaining the operation of obtaining content information from the DMS 500 of the television receiver 2. When the DMC (the control terminal 1) compliant to the UPnP AV standard issues a request for content information to the DMS 500 of the television receiver 2 via the network NT, then, as illustrated in FIG. 11, the content information reader 506 of the DMS 500 reads, from a content accumulating module (FIG. 9: the HDD 215), the content information according to the request for content information received from the DMC (the control terminal 1). Subsequently, the content information sender 507 of the DMS 500 sends the content information (the content list) that has been read to the DMC (the control terminal 1). Then, the DMC (the control terminal 1) presents the content list to the user who is operating the DMC (the control terminal 1). (For example, the DMC (the control terminal 1) displays the content list on the display module 103).

Figure 12:
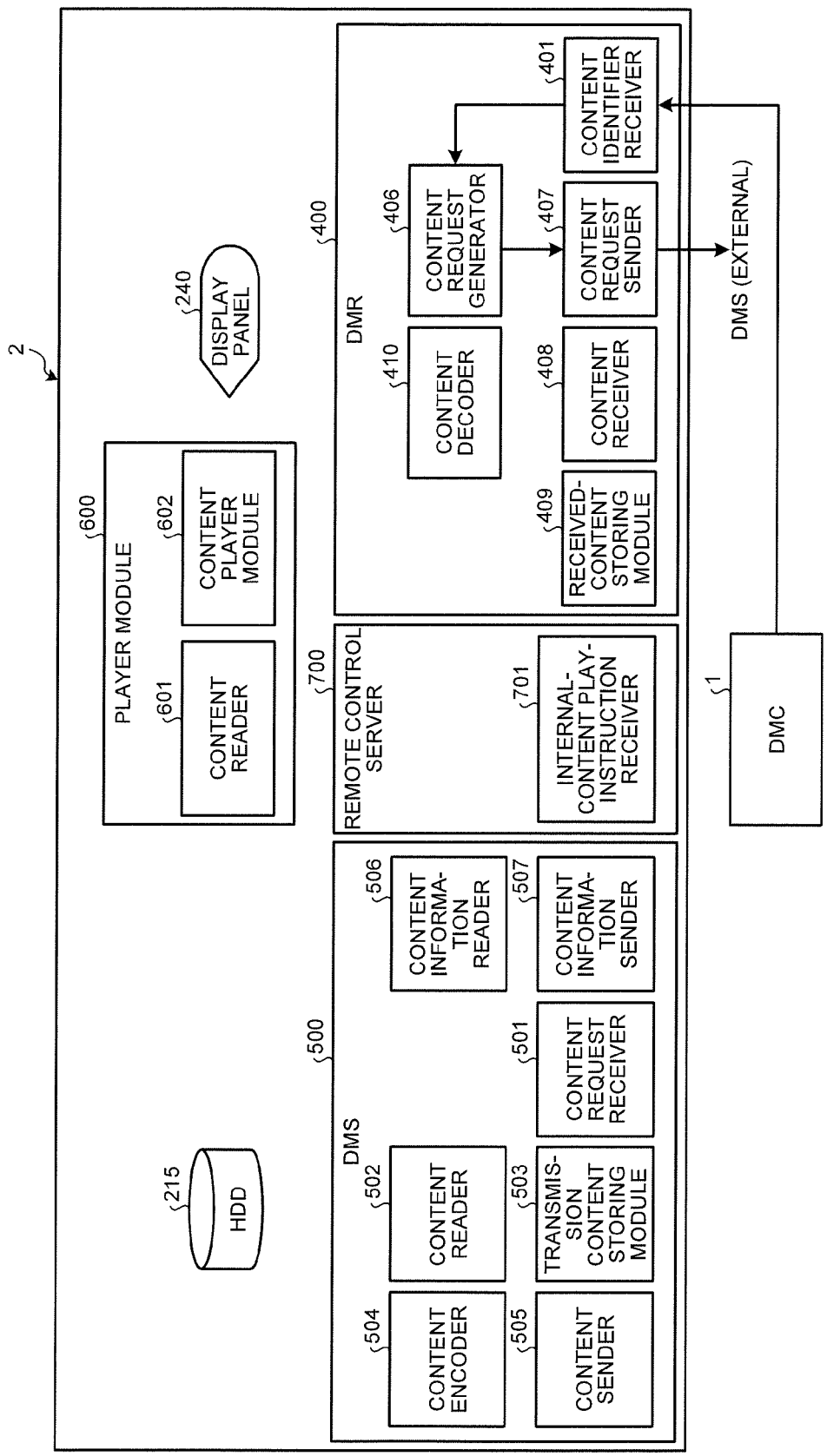
FIG. 12 is an exemplary diagram for explaining a content request issuing operation performed by a DMR in the embodiment.

Explained below in detail is a content request issuing operation performed by the DMR 400 of the basic television receiver 2. FIG. 12 is an explanatory diagram for explaining a content request issuing operation performed by the DMR 400 of the television receiver 2. As illustrated in FIG. 12, when the DMC (the control terminal 1) compliant to the UPnP AV standard sends, to the DMR 400 of the television receiver 2 via the network NT, the content identifier of a content selected from the content list by the user operation, the content identifier receiver 401 receives the content identifier. Subsequently, the content request generator 406 of the DMR 400 generates a content request according to the content identifier received by the content identifier receiver 401 and the content request sender 407 sends the content request, which is generated by the content request generator 406, to the corresponding DMS (external) via the network NT.

Figure 13:
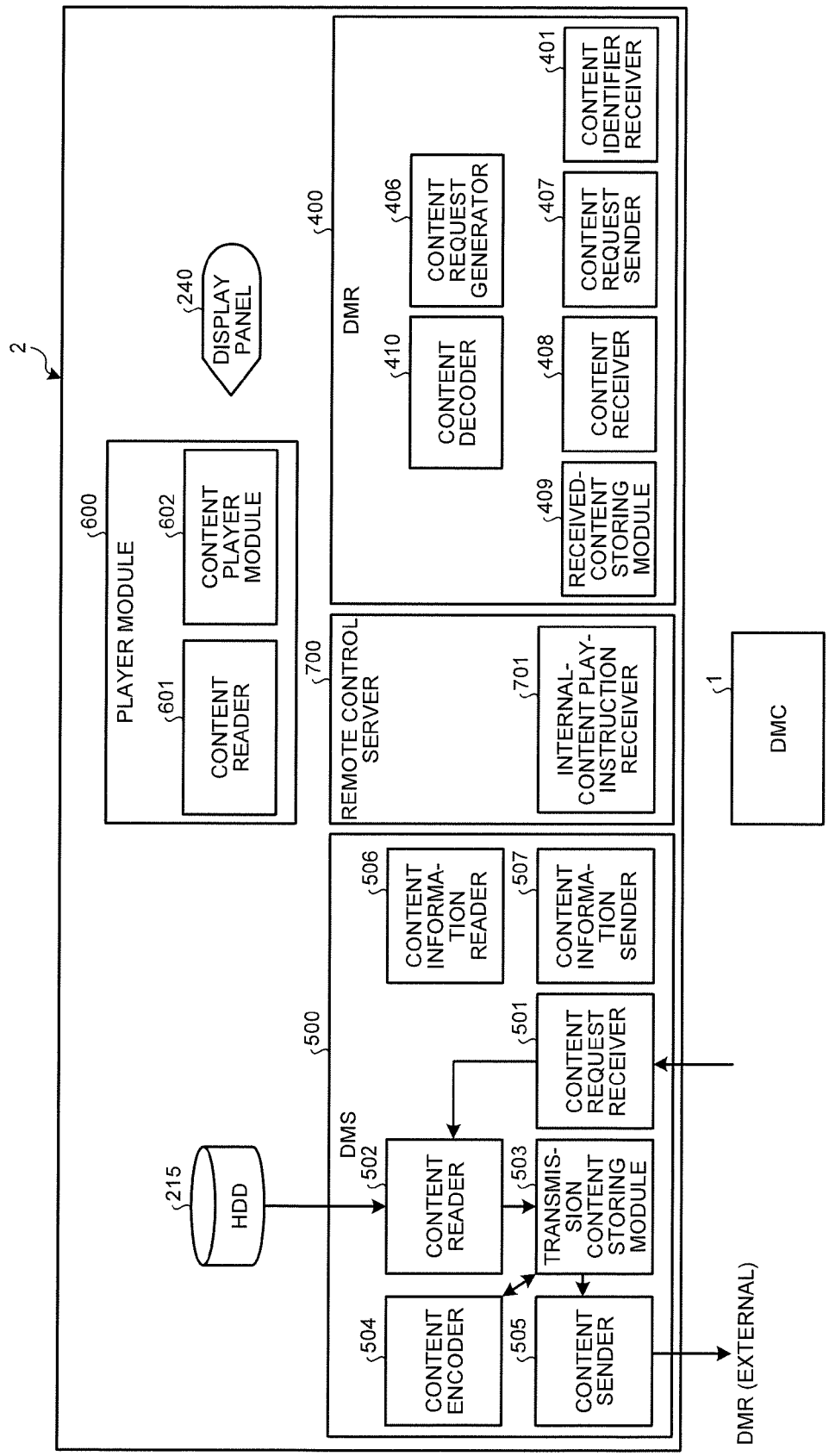
FIG. 13 is an exemplary diagram for explaining a content sending operation performed by the DMS in the embodiment.

Explained below in detail is a content sending operation performed by the DMS 500 of the basic television receiver 2. FIG. 13 is an explanatory diagram for explaining a content sending operation performed by the DMS 500 of the television receiver 2. As illustrated in FIG. 13, upon receiving a content request from a DMR (external) via the network NT, the content request receiver 501 of the DMS 500 reads, from the HDD 215, the specified content according to the content request received by the content reader 502 of the DMS 500. Then, the content request receiver 501 temporarily stores the content that has been read in the transmission content storing module 503 of the DMS 500. Subsequently, the content encoder 504 of the DMS 500 encodes the transmission content stored in the transmission content storing module 503 and returns the encoded content to the transmission content storing module 503. Then, the content sender 505 of the DMS 500 sends the transmission content, which is stored in an encoded form in the transmission content storing module 503, to the DMR (external) that had issued the corresponding content request.

Figure 14:
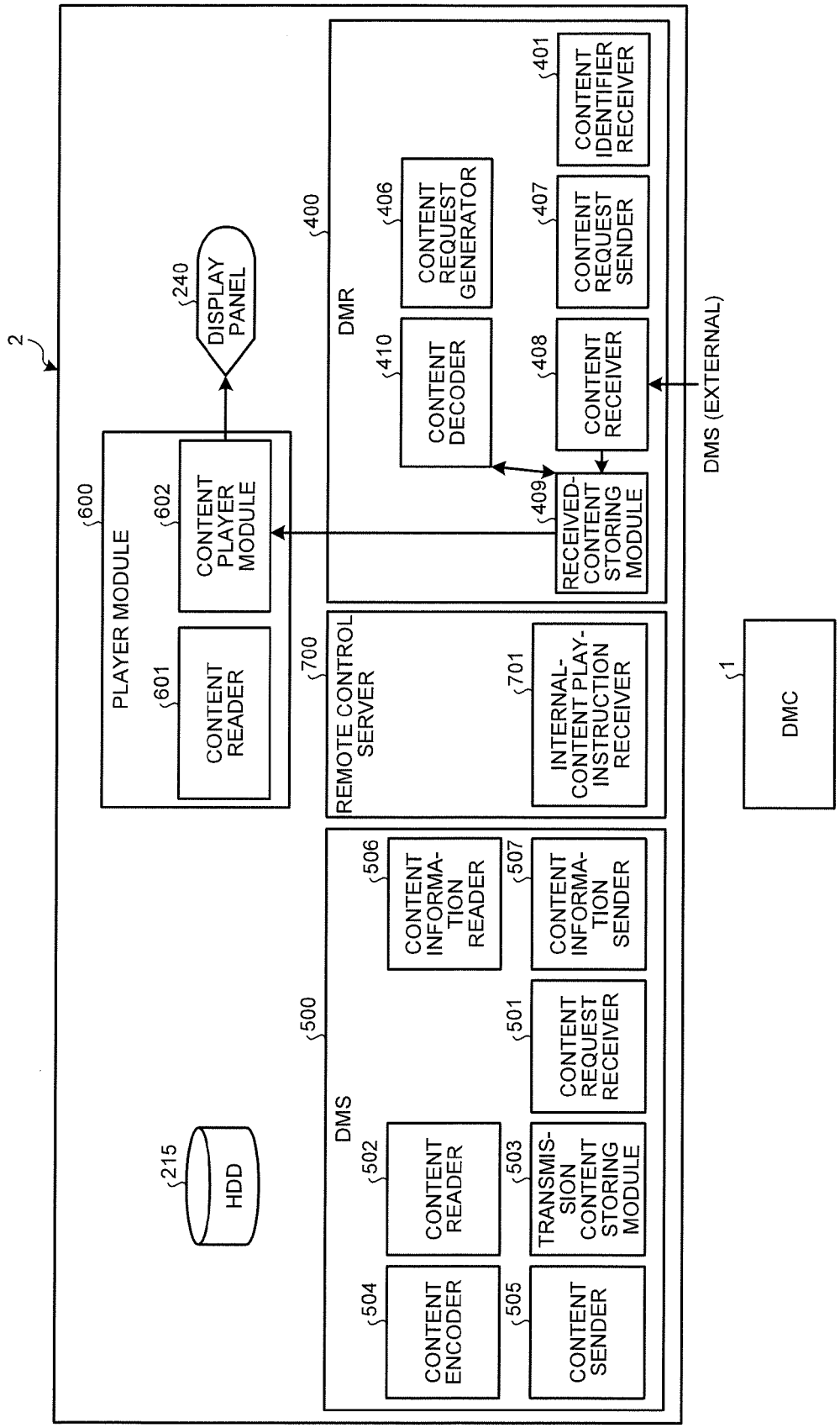
FIG. 14 is an exemplary diagram for explaining the operation of receiving and playing a content as performed by the DMR in the embodiment.

Explained below in detail is the operation of receiving and playing of the content as performed by the DMR 400 of the basic television receiver 2. FIG. 14 is an explanatory diagram for explaining the operation of receiving and playing of the content as performed by the DMR 400 of the basic television receiver 2. As illustrated in FIG. 14, when the content receiver 408 of the DMR 400 receives, from the DMS (external), the content sent in response to a content request issued by the content request sender 407, the received-content storing module 409 stores the received content on a temporary basis. Subsequently, the content decoder 410 decodes the encoded content, which is stored in the received-content storing module 409, and returns the decoded content to the received-content storing module 409. Then, the content player module 602 of the player module 600 plays the decoded content, which is stored in the received-content storing module 409, and outputs the played content on the display panel 240.

Explained below is the manner in which the control terminal 1 (DMC) resolves the issues described above when the television receiver 2 comprises the DMS 500 from which the content selected by the DMC (control terminal 1) is transferred as well as the DMR 400 to which the selected content is to be transferred.

Figure 15:
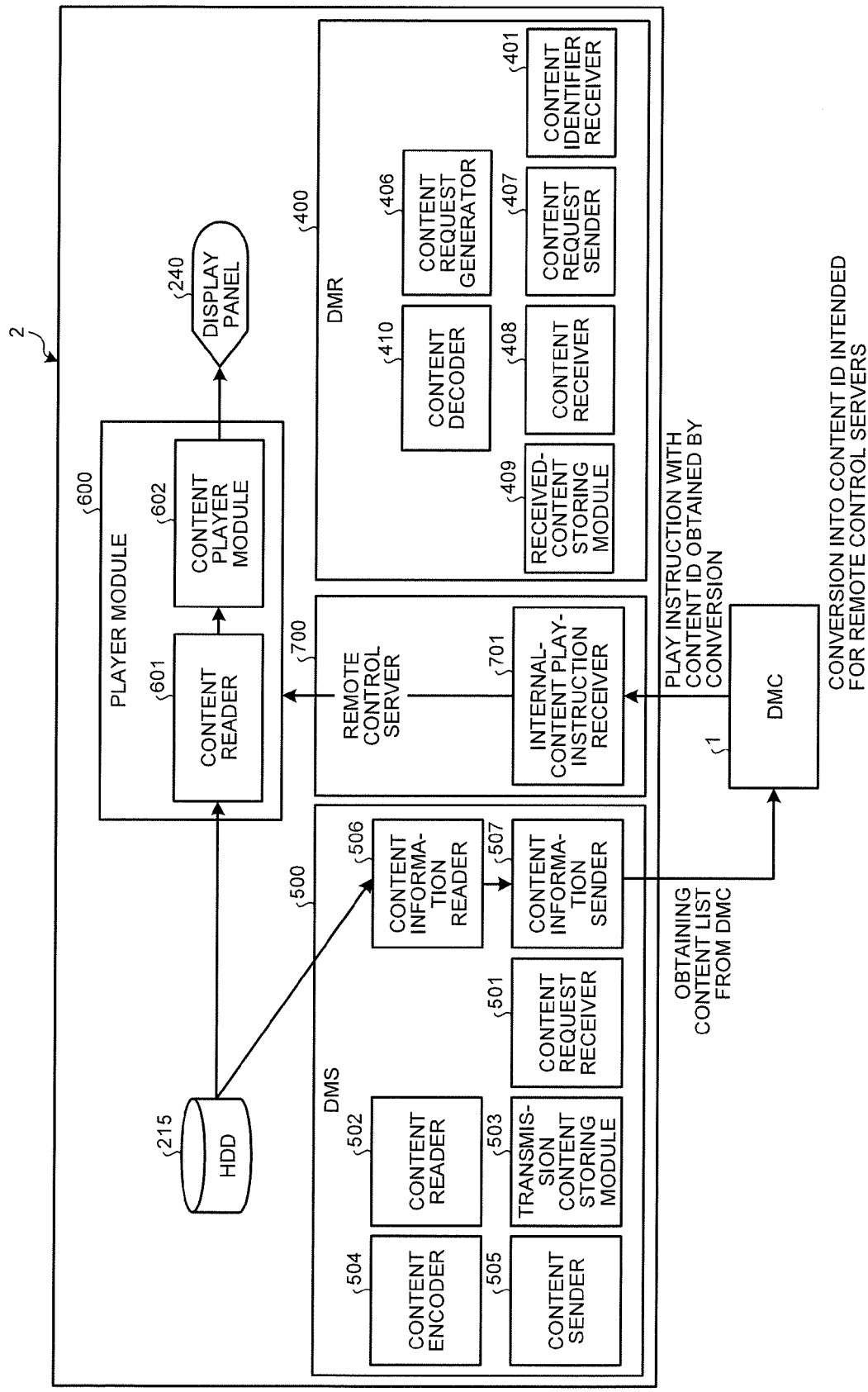
FIG. 15 is an exemplary diagram for explaining a content playing operation performed in the television apparatus in the embodiment.

FIG. 15 is an explanatory diagram for explaining a content playing operation performed in the television receiver 2. When the DMC (the control terminal 1) compliant to the UPnP AV standard issues a request for content information to the DMS 500 of the television receiver 2; as illustrated in FIG. 15, the content information reader 506 of the DMS 500 reads, from a content accumulating module (FIG. 9: the HDD 215), the content information according to the content information request received from the DMC (the control terminal 1). Then, the content information sender 507 of the DMS 500 sends the content information (content list) to the DMC (the control terminal 1) in an identical manner to that described with reference to FIG. 11.

From among the process performed by the control terminal 1 that has received the content information (the content list) as described above, specific process is explained below.

Figure 16:
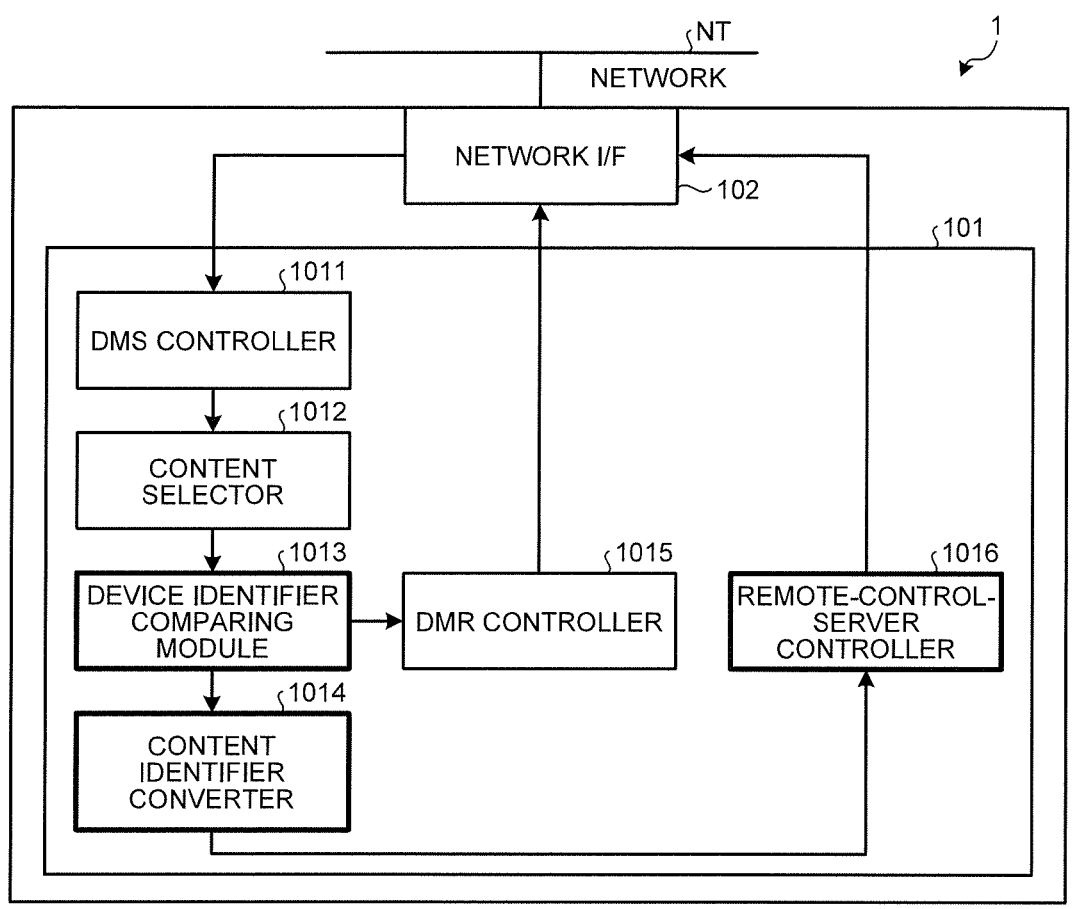
FIG. 16 is an exemplary block diagram of a functional configuration of a controller of the control terminal in the embodiment.

FIG. 16 is a block diagram of a functional configuration of the controller 101 of the control terminal 1. As illustrated in FIG. 16, the controller 101 comprises a DMS controller 1011, a content selector 1012, a device identifier comparing module 1013, a content identifier converter 1014, a DMR controller 1015, and a remote-control-server controller 1016.

The DMS controller 1011 (content information obtaining module) detects one or more DMSs connected to the network NT, obtains a portion of or an entire pieces of the content information presented by the DMSs based on the instruction/settings/program set by the user, and transfers the obtained content information to the content selector 1012.

Based on the instruction/settings/program set by the user, the content selector 1012 (content selector) selects the content to be played from the obtained content information; and transfers the selected content to the device identifier comparing module 1013.

The device identifier comparing module 1013 compares the device identifier of the DMS which stores therein the selected content and the device identifier of the DMR selected based on the instruction/settings/program set by the user. If the two device identifiers are identical, then the device identifier comparing module 1013 sends the content information of the selected content to the content identifier converter 1014. On the other hand, if the two device identifiers are not identical, then the device identifier comparing module 1013 sends the content information of the selected content to the DMR controller 1015.

Based on a predetermined conversion rule, the content identifier converter 1014 converts the content information of the selected content into a content identifier intended for remote control servers, and then sends the content identifier to the remote control server 700 of the television receiver 2.

Thus, the device identifier comparing module 1013 and the content identifier converter 1014 correspond to an identifier converter.

The DMR controller 1015 corresponds to a content play controller. From the content information of the selected content, the DMR controller 1015 (content play controller) extracts the content identifier, generates a play instruction message, and sends the message to the selected DMR (see FIG. 12).

Based on the content identifier intended for remote control servers, the remote-control-server controller 1016 (remote-control-server controller) sends the play control message regarding the selected content to the remote control server 700 of the television receiver 2, which has the same device identifier as that of the DMS 500 and which holds the selected content.

Figure 17:
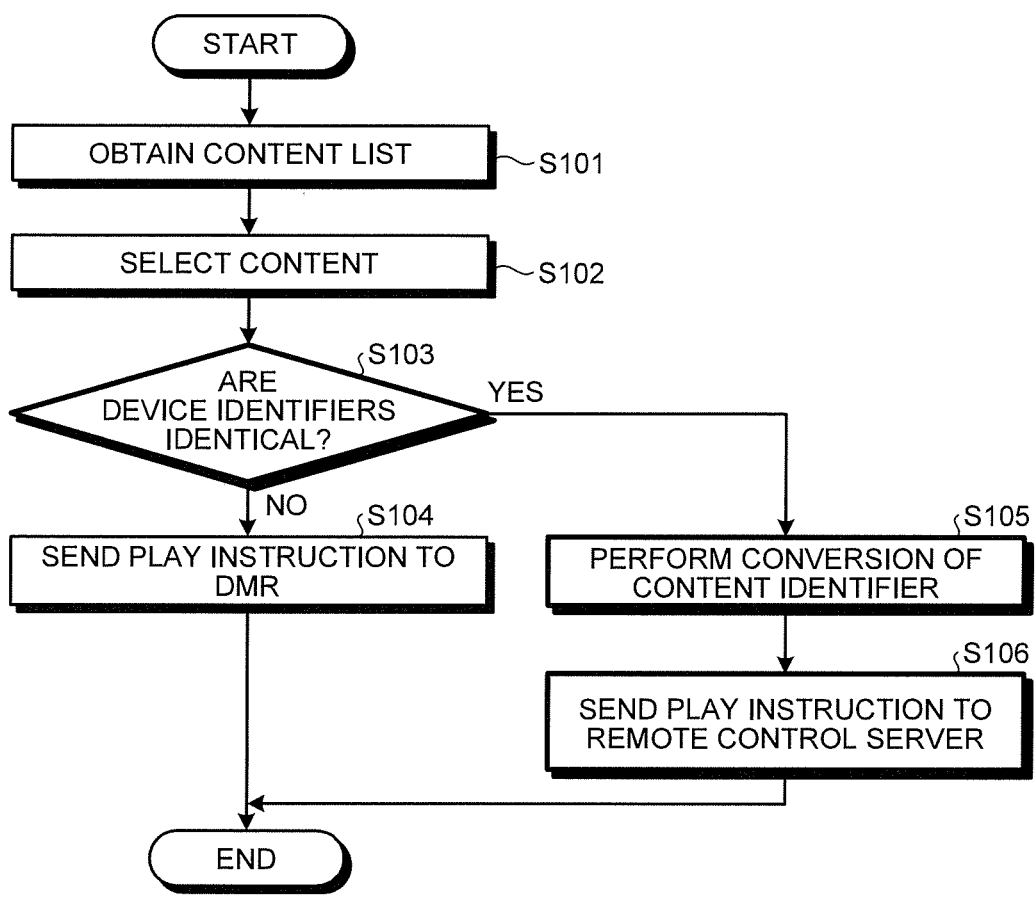
FIG. 17 is an exemplary flowchart of a content play instructing operation in the embodiment.

Explained below with reference to a flowchart illustrated in FIG. 17 is a content play instructing operation performed by the controller 101 of the control terminal 1. Herein, it is assumed that the user has operated the control terminal 1 to select one of the DMRs present on the network NT.

Firstly, the DMS controller 1011 obtains the content list sent by the content information sender 507 of the DMS 500 (S101). Then, the content selector 1012 presents the content list to the user who is operating the control terminal 1 (for example, displays the content list on the display module 103 of the control terminal 1), and prompts the user to perform a user operation for selecting a content from the content list (S102).

Then, the device identifier comparing module 1013 compares the device identifier of the DMS 500, which stores therein the selected content, and the device identifier of the DMR, which is selected based on the instruction/settings/program set by the user (S103). As illustrated in FIG. 4 or FIG. 5, the device identifier of the DMS 500, which stores therein the selected content, is specified in the form of the IP address in the content information sent by the DMS 500. The DMC (the control terminal 1) searches the network NT for the DMRs based on the UPnP protocols, and obtains the IP address of each DMR. Thus, the device identifier of the DMR, which is selected based on the instruction/settings/program set by the user, is an IP address obtained in the abovementioned manner.

If the two device identifiers are determined to be identical (Yes at S103), then the device identifier comparing module 1013 transfers the content information of the selected content to the content identifier converter 1014 (S105).

On the other hand, if the two device identifiers are determined not to be identical (No at S103), then the device identifier comparing module 1013 transfers the content information of the selected content to the DMR controller 1015 (S104).

At S104, since the selected DMR is installed outside of the television receiver 2, the DMR controller 1015 extracts the content identifier from the content information of the selected content, generates a play instruction message, and sends the message to the selected DMR (external).

In contrast, at S105, since the selected DMR is the DMR 400 of the television receiver 2, the DMS 500 from which the content is sent and the DMR 400 to which the content is sent are installed in the same apparatus. Hence, based on a predetermined conversion rule, the content identifier converter 1014 converts the content information of the selected content into a content identifier intended for remote control servers (i.e., into a content identifier for remote controlling).

More particularly, the content identifier converter 1014 converts the content information of the selected content into a content identifier such as the Object ID of the selected content, or the path name of the Resource URI of the selected content, or the Browse Index of the selected content, or an independent identifier intended for remote control servers. Meanwhile, if the content information obtained from the DMS 500 contains the content identifier intended for remote control servers, then the content identifier converter 1014 uses that content identifier.

As another example, content information (such as title, date, channel, recording start timing, etc.) can be obtained from the remote control server 700 of the television receiver 2. Then, a content identifier, intended for remote control servers, of the content to be played can be extracted from a combination of a portion of or all of: the content information (such as title, date, channel, recording start timing, etc.) obtained from the DMS 500; and the content information (such as title, date, channel, recording start timing, etc.) obtained from the DMS 500.

Inside the television receiver 2, the structure of a content identifier may vary depending on the content type in the USB HDD or in the network attached storage (NAS) that is a network/LAN connection-type HDD. In such a case, a conversion rule is set in advance by taking into account the content type. Then, the content type and the content identifier are extracted from the content information in the DMS 500 and are converted into a content identifier intended for remote control servers.

Meanwhile, instead of the content identifier converter 1014 storing therein the conversion rule, the content identifier converter 1014 can refer to the television receiver 2 for the conversion rule at the time of performing conversion into a content identifier intended for remote control servers.

Subsequently, based on the content identifier intended for remote control servers, the remote-control-server controller 1016 sends a play control message regarding the selected content to the remote control server 700 of the television receiver 2 that has the same device identifier as the DMS 500 and that stores therein the content (S106).

Meanwhile, in the case when the destination apparatus for sending a control message does not comprise a remote control server, that is, in the case when the remote control server to which a control message is to be sent is absent, the remote-control-server controller 1016 issues a warning to the user that the content cannot be played (for example, displays the warning on the display module 103 of the control terminal 1).

In this way, when the DMS 500 from which the content is sent and the DMR 400 to which the content is sent are installed in the same apparatus as illustrated in FIG. 15, the internal-content play-instruction receiver 701 of the remote control server 700 receives a play control message based on the content identifier intended for remote control servers that is obtained by conversion of the content information of the selected content. Then, the internal-content play-instruction receiver 701 transfers that play control message to the content reader 601 of the player module 600.

Then, based on the play instruction (play control message) received by the internal-content play-instruction receiver 701 of the remote control server 700, the content reader 601 of the player module 600 reads the specified content from the content accumulating module (FIG. 9: the HDD 215) and transfers it to the content player module 602.

The content player module 602 of the player module 600 plays the content, which is read by the content reader 601 from the content accumulating module (FIG. 9: the HDD 215), and displays the played content on the display panel 240.

The configuration and the operations of the network system according to the embodiment are explained above. In a network system comprising electronic devices compliant to the UPnP AV standard and to the DLNA guideline, since the user selects a content without differentiating between the DMSs, the selected DMR and the DMS holding the selected content might be provided in the same device. However, even in such a case, in the network system described above according to the embodiment, with respect to an apparatus that cannot perform transfer of a content when the DMS and the DMR selected by the user are installed in the same device, a remote control service capable of playing the local content of the apparatus can be used. Accordingly, operations equivalent to internal playing can be performed without having to perform network streaming. That enables achieving reduction in the resource consumption of the apparatus and enables playing the intended content while relaxing the restrictions on simultaneous processing.

Moreover, the user who is operating the control terminal can transfer a content without having to be concerned about the fact that the apparatus sending the content stored therein is same as the apparatus receiving the content.

Meanwhile, in the embodiment, it is the content identifier converter 1014 of the control terminal 1 that converts the content information of the selected content in a content identifier intended for remote control servers on the basis of a predetermined conversion rule. However, alternatively for example, if the device identifier comparing module 1013 determines that the device identifiers are not identical, then the content information of the selected content can be sent to the remote control server 700 of the television receiver 2, so that the remote control server 700 can convert the content information into a content identifier intended for remote control servers on the basis of a predetermined conversion rule. Based on such content identifier intended for remote control servers, the remote control server 700 can then generate a play control message regarding the selected content.

Meanwhile, a computer program executed in the control terminal 1 according to the embodiment is stored in advance in a ROM or the like. Alternatively, the computer program executed in the control terminal 1 according to the embodiment can be provided in the form of an installable or executable file on a computer-readable recording medium such as a compact disk read only memory (CD-ROM), a flexible disk (FD), a compact disk readable (CD-R), or a digital versatile disk (DVD). Still alternatively, the computer program executed in the control terminal 1 according to the embodiment can be saved as a downloadable file on a computer connected to a network such as the Internet or can be made available for distribution through the network. Still alternatively, the computer program executed in the control terminal 1 according to the embodiment can be distributed over a network such as the Internet.

Herein, the computer program executed in the control terminal 1 according to the embodiment contains modules for implementing the functions of the abovementioned constituent elements (the DMS controller 1011, the content selector 1012, the device identifier comparing module 1013, the content identifier converter 1014, the DMR controller 1015, and the remote-control-server controller 1016). Regarding the actual hardware, a CPU (processor) retrieves the computer program from the ROM and runs it so that the computer program is loaded in a main memory device. As a result, the functions of the DMS controller 1011, the content selector 1012, the device identifier comparing module 1013, the content identifier converter 1014, the DMR controller 1015, and the remote-control-server controller 1016 are implemented in the main memory device.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A control terminal configured to be connectable to a content sender and a content receiver via a network, the content sender being configured to send a specified content, the content receiver being configured to receive the content sent by the content sender, the control terminal being provided separately from the content sender and the content receiver, the control terminal comprising:

a processor; a storage device communicatively coupled to the processor, the storage device comprises a content information obtaining module that, when executed by the processor, configured to obtain a portion of or an entire pieces of content information presented by one or more content sender connected to the network; a content selector that, when executed by the processor, configured to select, from the portion of or the entire pieces of content information, a content to be played; a device identifier comparing module that, when executed by the processor, configured to compare a device identifier of the content sender which is to send the selected content and a device identifier of the content receiver which is to receive the selected content, with each other; an identifier converter that, when executed by the processor, configured to (1) convert, if the device identifier of the content sender is identical to the device identifier of the content receiver, content information of the selected content into a content identifier for remote controlling in a remote control server, based on a conversion rule set in advance, the remote control server being configured to control remote operations with respect to content on the network, and where the content identifier is present in a portion of at least one of the content or the content information, (2) obtain the content information and extract the content identifier from a combination of a portion of or all of the content and the content information presented by the content sender; and a remote-control-server controller, executed by the processor, configured to send, based on the content identifier for remote controlling, a play control message of the selected content to the remote control server comprising a device identifier same as that of the content sender and of the content receiver.

2. The control terminal of claim 1, further comprising a content play controller configured to extract, if it is determined that the device identifier of the content sender which is to send the selected content is not identical to the device identifier of the content receiver which is to receive the selected content, a content identifier from content information of the selected content, and to send a play control message of the selected content to the content receiver which is to receive the selected content.

3. The control terminal of claim 1, wherein, if the remote control server to which the play control message is to be sent is absent, the remote-control-server controller is configured to issue a warning indicating that content cannot be played.

4. The control terminal of claim 1, wherein the device identifiers compared by the device identifier comparing module are Internet protocol (IP) addresses, each representing a number used in identifying a device on the network.

5. A network system comprising:
a content sender configured to send a specified content; a content receiver configured to receive the content sent by the content sender; a remote control server configured to control remote operations with respect to content on a network; a control terminal configured to be connectable to the content sender, the content receiver, and the remote control server via the network, the control terminal being provided separately from the content sender and the content receiver, the control terminal being configured to select a content to be played from content information presented by one or more content senders connected to the network; and a player module configured to play content supplied to the content receiver from outside or content accumulated in the content sender by remote controlling via the remote control server, wherein the control terminal is configured to compare a device identifier of the content sender which is to send the selected content and a device identifier of the content receiver which is to receive the selected content with each other, the control terminal is configured to send, if the device identifier of the content sender is identical to the device identifier of the content receiver, content information of the selected content to the remote control server comprising a device identifier same as that of the content sender and of the content receiver, and the remote control server is configured to (1) convert content information of the selected content sent by the control terminal into a content identifier for remote controlling in the remote control server based on a conversion rule set in advance or (2) extract the content identifier from a portion of at least one of the content or the content information presented by the content sender, generate a play control message of the selected content based on the content identifier for the remote controlling, and to send the generated play control message to the player module.

6. A contents playing method comprising:
determining whether a device identifier of a content sender configured to send a content selected at a control terminal is identical to a device identifier of a content receiver configured to receive the content selected at the control terminal, the control terminal being provided separately from the content sender and the content receiver; converting, if it is determined that the device identifier of the content sender is identical to the device identifier of the content receiver, content information of the selected content into a content identifier for remote controlling in a remote control server based on a conversion rule set in advance, the remote control server being configured to control remote operations with respect to content on the network; obtaining, where the content identifier is present in a portion of at least one of the content or the content information, the content information and extracting the content identifier for remote controlling from a combination of a portion of or all of the content and the content information presented by the content sender; and generating, based on the content identifier for remote controlling obtained by conversion, a play control message regarding the selected content accumulated in the content sender.

\* \* \* \* \*